United States Patent
Miller

(10) Patent No.: US 10,994,378 B2
(45) Date of Patent: May 4, 2021

(54) DIE BODY APPARATUS AND METHODS

(71) Applicant: Corning Incorporated, Corning, NY (US)

(72) Inventor: Timothy Michael Miller, Elmira, NY (US)

(73) Assignee: Corning Incorporated, Corning, NY (US)

( * ) Notice: Subject to any disclaimer, the term of this patent is extended or adjusted under 35 U.S.C. 154(b) by 712 days.

(21) Appl. No.: 15/522,645

(22) PCT Filed: Oct. 27, 2015

(86) PCT No.: PCT/US2015/057530
§ 371 (c)(1),
(2) Date: Apr. 27, 2017

(87) PCT Pub. No.: WO2016/069573
PCT Pub. Date: May 6, 2016

(65) Prior Publication Data
US 2017/0334027 A1    Nov. 23, 2017

Related U.S. Application Data

(60) Provisional application No. 62/068,862, filed on Oct. 27, 2014.

(51) Int. Cl.
*B23P 15/24* (2006.01)
*B28B 3/26* (2006.01)

(52) U.S. Cl.
CPC ............ *B23P 15/243* (2013.01); *B28B 3/269* (2013.01); *B28B 3/2663* (2013.01)

(58) Field of Classification Search
CPC ....... B28B 3/2663; B28B 3/269; B23P 15/243
See application file for complete search history.

(56) References Cited

U.S. PATENT DOCUMENTS 4,418,456 A    12/1983  Riehl
4,486,934 A    12/1984  Reed
(Continued)

OTHER PUBLICATIONS

English Translation of CN201580064600.7 Office Action dated Oct. 31, 2018; 13 pages; Chinese Patent Office.
(Continued)

*Primary Examiner* — Joseph S Del Sole
*Assistant Examiner* — Jamel M Nelson
(74) *Attorney, Agent, or Firm* — Kurt. R Denniston

(57) ABSTRACT

A die body apparatus (101) includes a first discharge member (105) configured to be bonded with respect to a base member (103) such that aligned elongated openings (209) of the base member (103) and first discharge member (105) provide a plurality of elongated feed passages placing a plurality of feed holes (106) of the base member (103) in fluid communication with a first honeycomb network of discharge slots (415) of the first discharge member (105). In further examples, methods of assembling a die body apparatus (101) includes the step of bonding a selected discharge member (105) of at least one discharge member with respect to a base member (103). In further examples methods of extruding batch material into a honeycomb body includes the steps of bonding a selected discharge member (105) with respect to a base member (103) and extruding a quantity of batch material through the die body apparatus (101) into an extruded honeycomb body with a honeycomb network of channels.

23 Claims, 11 Drawing Sheets

(56) References Cited

U.S. PATENT DOCUMENTS

| | | | |
|---|---|---|---|
| 4,731,010 | A | 3/1988 | Cunningham |
| 5,238,386 | A | 8/1993 | Cunningham et al. |
| 5,761,787 | A | 6/1998 | Kragle et al. |
| 6,413,072 | B1 | 7/2002 | Brew et al. |
| 6,432,249 | B1 | 8/2002 | Cunningham et al. |
| 6,641,385 | B2 | 11/2003 | Fujita et al. |
| 8,857,327 | B2 | 10/2014 | Stefani et al. |
| 2006/0034972 | A1 | 2/2006 | Takahashi et al. |
| 2008/0026092 | A1 | 1/2008 | Tagliati et al. |
| 2008/0078920 | A1 | 4/2008 | Takahashi et al. |
| 2009/0232927 | A1 * | 9/2009 | Takahashi ............... B28B 7/346 425/464 |
| 2014/0060253 | A1 | 3/2014 | Brew et al. |
| 2017/0120498 | A1 | 5/2017 | Brew et al. |

OTHER PUBLICATIONS

PCT Search Report and Written Opinion, PCT/US2015/057530, filed Oct. 27, 2015 dated Mar. 15, 2016.
English Translation of JP2017522647 Office Action dated Nov. 28, 2018, Japan Patent Office, 5 pgs.

\* cited by examiner

US 10,994,378 B2

DIE BODY APPARATUS AND METHODS

This application claims the benefit of priority under 35 U.S.C. § 365 of International Patent Application Serial No. PCT/US2015/057530 filed on Oct. 27, 2015 designating the United States of America, which in turn claims the benefit of priority under 35 U.S.C. § 119 of U.S. Provisional Patent Application Ser. No. 62/068,862, filed on Oct. 27, 2014, the contents of which are relied upon and incorporated herein by reference in their entirety.

FIELD

The present disclosure relates generally to die body apparatus and methods, and more particularly, to die body apparatus configured to extrude a honeycomb body, methods of assembling a die body apparatus, and methods of extruding batch material into a honeycomb body with a die body apparatus.

BACKGROUND

It is known to manufacture die body apparatus with a plurality of feed holes and an array of pins that are spaced apart to define a honeycomb network of discharge slots. The die body apparatus may be mounted to portions of an extrusion die apparatus to extrude a green body from a batch of ceramic and/or ceramic-forming material. The green body is typically subsequently processed into a ceramic honeycomb substrate that may be used as a particulate filter and/or a catalytic carrier to process exhaust, for example, from a diesel engine.

SUMMARY

In accordance with a first aspect, a die body apparatus is disclosed that is configured to extrude a honeycomb body. The die body apparatus comprises a base member including a first face, a second face, a plurality of feed holes intersecting the first face, and a first set of elongated feed channels. The first set of elongated feed channels each include an elongated length extending along the second face, a width extending transverse to the length, a depth from the second face, and an elongated opening intersecting the second face and extending along the length of the feed channel. Each of the elongated feed channels of the first set of elongated feed channels is in fluid communication with a corresponding set of the plurality of feed holes that are intersected by the elongated feed channel. The die body apparatus further includes a first discharge member including a first face, a second face, a second set of elongated feed channels that each include an elongated length extending along the first face of the first discharge member, a width extending transverse to the corresponding elongated length, a depth from the first face of the first discharge member, and an elongated opening intersecting the first face of the first discharge member and extending along the corresponding length of the feed channel. The first discharge member further includes a first array of pins that are spaced apart to define a first honeycomb network of discharge slots intersecting the second face of the first discharge member. The second set of elongated feed channels are in fluid communication with the first honeycomb network of discharge slots. The die body apparatus is provided wherein the first discharge member is configured to be bonded with respect to the base member such that each elongated opening of a plurality of the elongated feed channels of the first set of elongated feed channels is aligned with a corresponding elongated opening of the elongated feed channels of the second set of elongated feed channels to provide a plurality of elongated feed passages placing a plurality of the feed holes in fluid communication with the first honeycomb network of discharge slots.

In accordance with a second aspect, a method of assembling a die body apparatus is provided. The die body includes a base member including a first face, a second face, a plurality of feed holes intersecting the first face, and a first set of elongated feed channels that each include an elongated length extending along the second face, a width extending transverse to the length, a depth from the second face, and an elongated opening intersecting the second face and extending along the length of the feed channel. Each of the elongated feed channels of the first set of elongated feed channels is in fluid communication with a corresponding set of the plurality of feed holes that are intersected by the elongated feed channel. The die body further includes at least one discharge member including a first face, a second face, a second set of elongated feed channels that each include an elongated length extending along the first face of the at least one discharge member, a width extending transverse to the corresponding elongated length, a depth from the first face of the at least one discharge member, and an elongated opening intersecting the first face of the at least one discharge member and extending along the corresponding length of the feed channel. The at least one discharge member further includes an array of pins that are spaced apart to define a honeycomb network of discharge slots intersecting the second face of the at least one discharge member. The second set of elongated feed channels are in fluid communication with the honeycomb network of discharge slots. The method comprises the step (I) of bonding a selected discharge member of the at least one discharge member with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the honeycomb network of discharge slots.

In accordance with a third aspect, a method is provided for extruding batch material into a honeycomb body with a die body apparatus. The die apparatus comprises a base member including a first face, a second face, and a plurality of feed holes intersecting the first face. The base member further includes a first set of elongated feed channels that each include an elongated length extending along the second face, a width extending transverse to the length, a depth from the second face, and an elongated opening intersecting the second face and extending along the length of the feed channel. Each of the elongated feed channels of the first set of elongated feed channels is in fluid communication with a corresponding set of the plurality of feed holes that are intersected by the elongated feed channel. The die apparatus further includes at least one discharge member including a first face, a second face, a second set of elongated feed channels that each include an elongated length extending along the first face of the at least one discharge member, a width extending transverse to the corresponding elongated length, a depth from the first face of the at least one discharge member, and an elongated opening intersecting the first face of the at least one discharge member and extending along the corresponding length of the feed channel. The at least one discharge member further includes an array of pins that are spaced apart to define a honeycomb network of discharge slots intersecting the second face of the at least one discharge member, wherein the second set of elongated feed channels are in fluid communication with the honeycomb network of discharge slots. The method includes the step (I) of bonding a selected discharge member of the at least one discharge member with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the honeycomb network of discharge slots. The method further includes the step (II) of extruding a quantity of ceramic or ceramic-forming batch material through the die body apparatus into an extruded honeycomb body with a honeycomb network of channels.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
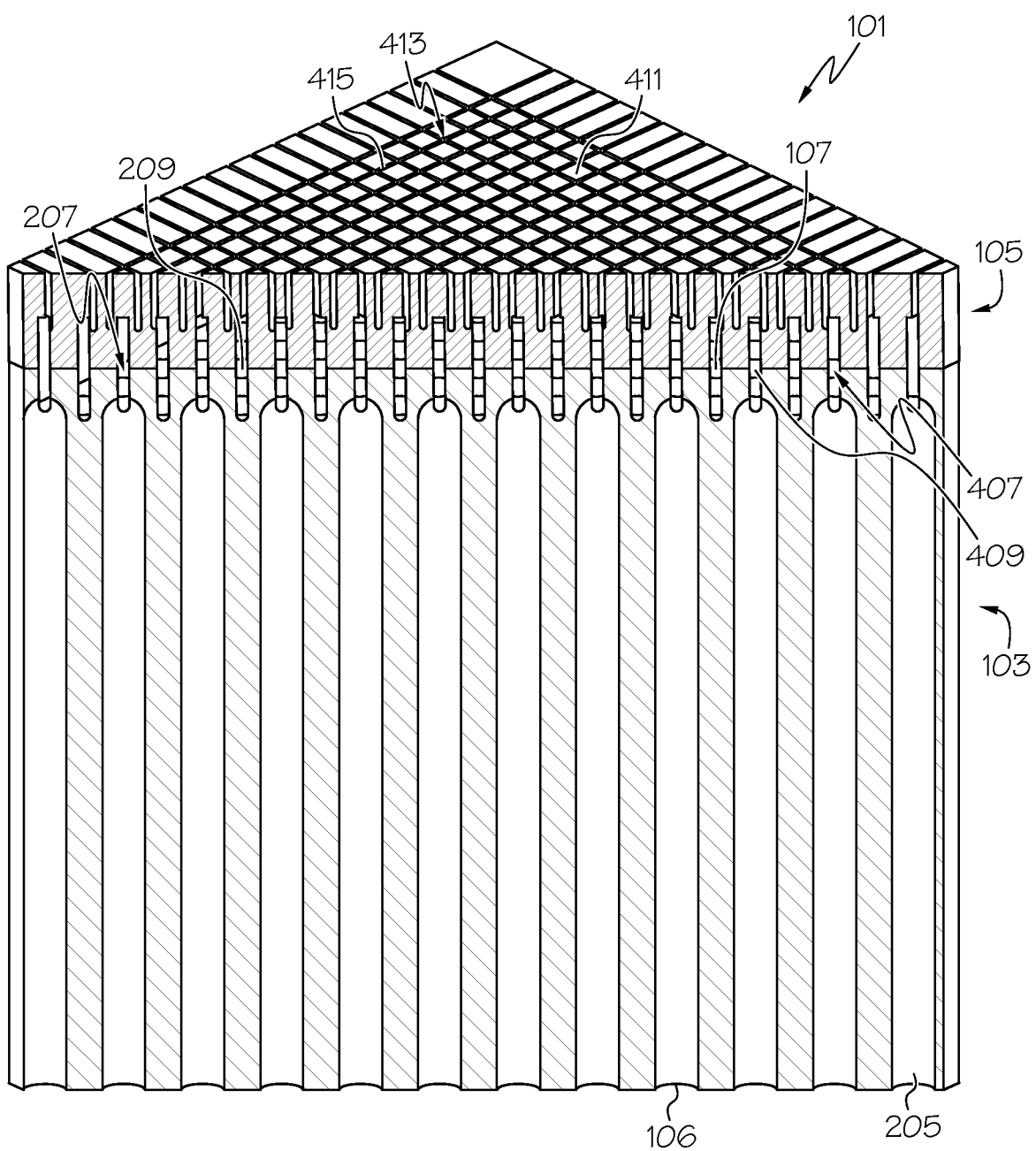
FIG. 1 is a cross-sectional view of an example die body apparatus with an example first discharge member bonded to an example base member in accordance with aspects of the disclosure.

The present disclosure will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein. These example embodiments are provided so that this disclosure will be both thorough and complete, and will fully convey the scope of the disclosure to those skilled in the art.

Referring now to FIG. 1, a die body apparatus 101 is provided and configured to be used to extrude a honeycomb body as discussed more fully below. The die body apparatus 101 includes a base member 103 that may be formed from stainless steel or other materials that can withstand the high pressure and corrosive environment of the extrusion process.

Figure 2:
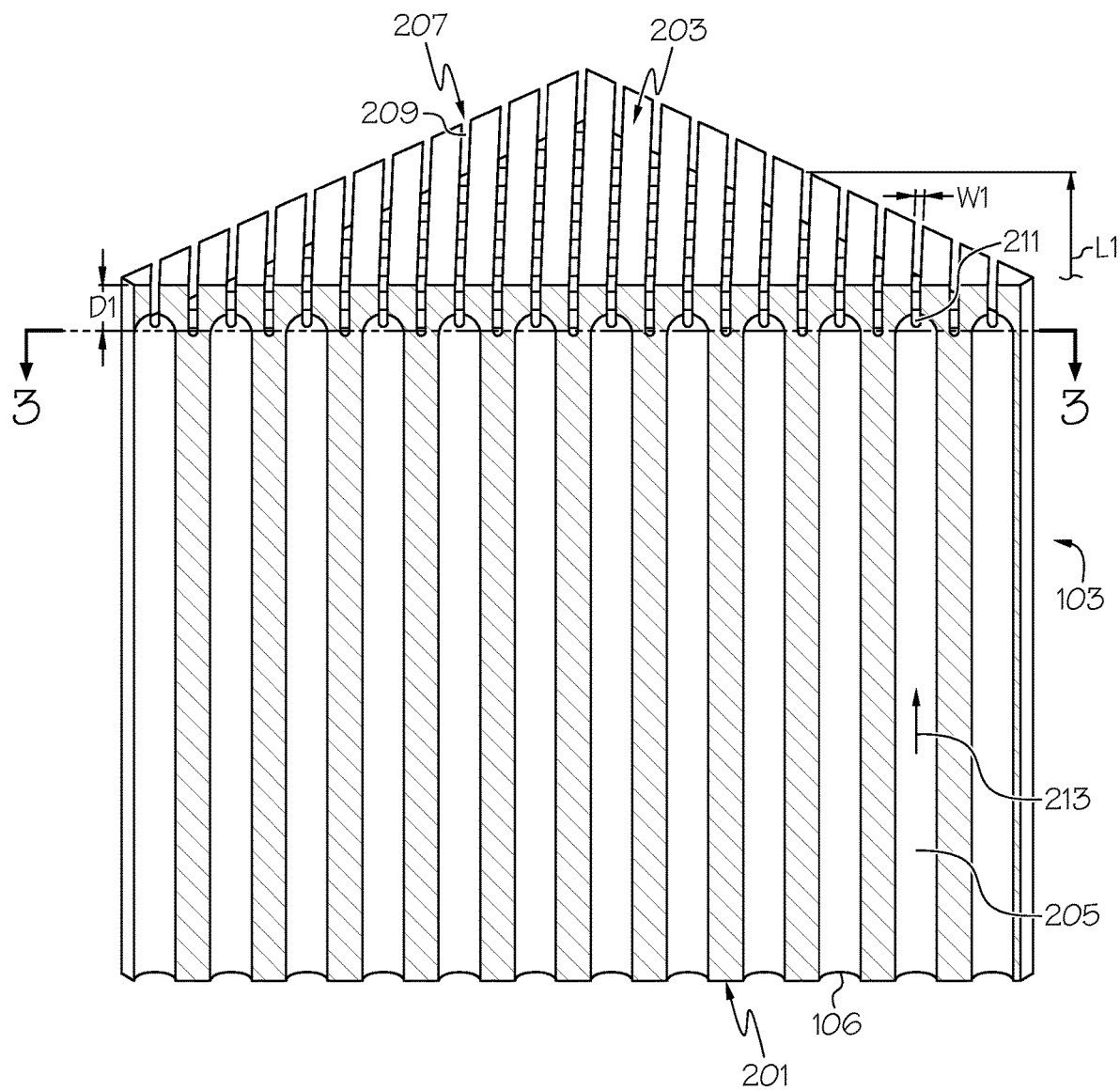
FIG. 2 is a cross-sectional view of the example base member of the example die body apparatus of FIG. 1.
Figure 3:
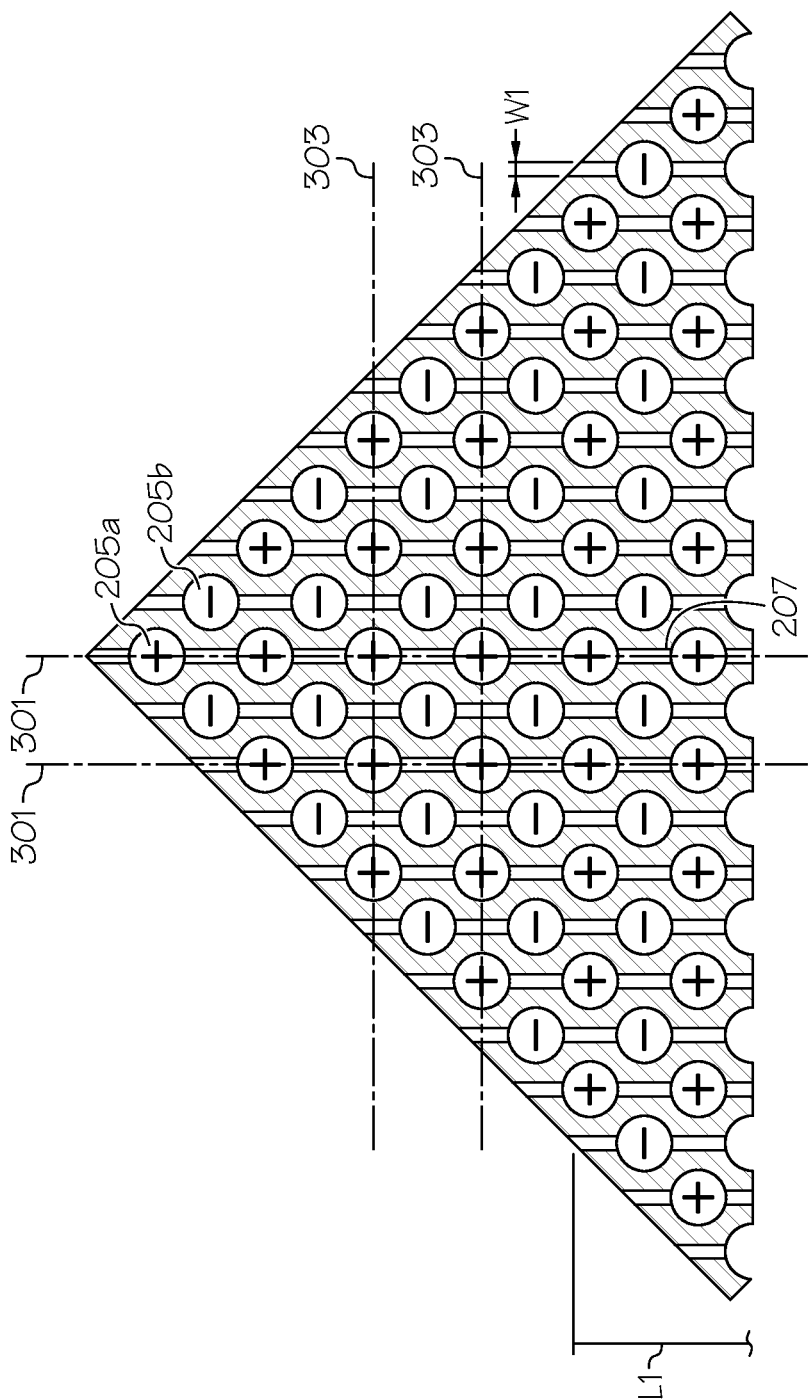
FIG. 3 is a cross-sectional view of the example base member along line 3-3 of FIG. 2.

Referring to FIG. 2, the base member 103 includes a first face 201 and a second face 203. As shown, each face 201, 203 may be substantially planar and parallel with one another although other nonplanar and/or nonparallel configurations may be provided in further examples. The base member 103 further includes a plurality of feed holes 205 intersecting the first face 201. Indeed, the plurality of feed holes 205 can intersect the first face 201 such that the feed holes are open to the first face. As such, batch material may freely pass through openings 106 in the first face 201 and into the feed holes 205. The feed holes may be provided in a wide range of configurations. For example, as shown in FIG. 3, the feed holes may be arranged along two offset matrices with a first set of feed holes 205a (indicted with "+" signs) being aligned along a first set of columns 301 and rows 303 of a first matrix and a second set of feed holes 205b (indicated with "−" signs) being aligned along a second set of rows and columns of a second matrix. The feed holes may be formed with a wide range of techniques such as machining (e.g., boring) the feed holes from the first face 201 toward the second face 203 without intersecting the second face 203. Indeed, as shown in FIG. 2, the feed holes 205 include a distal end 211 that is positioned at a depth below the second face 203 without intersecting the second face 203.

As illustrated in FIG. 2, the base member 103 further includes a first set of elongated feed channels 207 that each include an elongated length "L1" extending along the second face 203, a width "W1" extending transverse to the length "L1" and a depth "D1" from the second face 203. Each elongated feed channel 207 of the first set of elongated feed channels 207 is in fluid communication with a corresponding set of the plurality of feed holes 205 that are intersected by the elongated feed channel 207. For example, as shown in FIG. 3, the illustrated elongated feed channel 207 can intersect each feed hole 205a along a column 301 of feed holes 205a. In order to provide intersection, the elongated feed channels may be formed with the depth "D1" that is greater than the depth that the distal ends 211 of the feed holes 205 are located beneath the second face 203. As such, the lower end of the elongated feed channels 207 intersect with the distal end 211 of the feed holes 205 to provide fluid communication therebetween.

Each elongated feed channel 207 further includes an elongated opening 209 intersecting the second face 203 and extending along the length "L1" of the feed channel 207. Indeed, the elongated opening 209 can intersect the second face 203 such that the elongated openings 209 are open to the second face 203. As such, batch material may freely pass through openings 106 in the first face 201 and into the feed holes 205, along the feed holes 205 in direction 213, through the intersection of the feed holes with the elongated feed channels and eventually out the elongated openings 209 to leave the base member 103.

As illustrated in FIG. 2, the elongated feed channels 207 can be substantially straight although other profiles may be provided in further examples. For instance, the elongated feed channels may comprise curvilinear shapes (e.g., sinusoidal shapes), stepped shapes or other profile shapes. Furthermore, as shown, the elongated feed channels 207 can be parallel to one another although nonparallel configurations may be provided in further examples. In some instances, the profile and/or orientation of the elongated feed channels relative to one another may be provided to accommodate the particular feed hole configuration and thereby allow a desired intersection configuration between the feed channels and the feed holes. Indeed, the substantially straight and parallel configuration of the illustrated feed channels 207 may optionally allow each feed channel 207 to bisect each feed hole 205 in a corresponding column (e.g., 301) of feed holes.

Referring back to FIG. 1, the die body apparatus 101 further includes a first discharge member 105 configured to be bonded with respect to the base member 103. The first discharge member 105 may be formed with identical material as the base member 103 or may comprise different materials in further examples. For instance, the first discharge member 105 may be formed from stainless steel or other materials that can withstand the high pressure and corrosive environment of the extrusion process.

Figure 4:
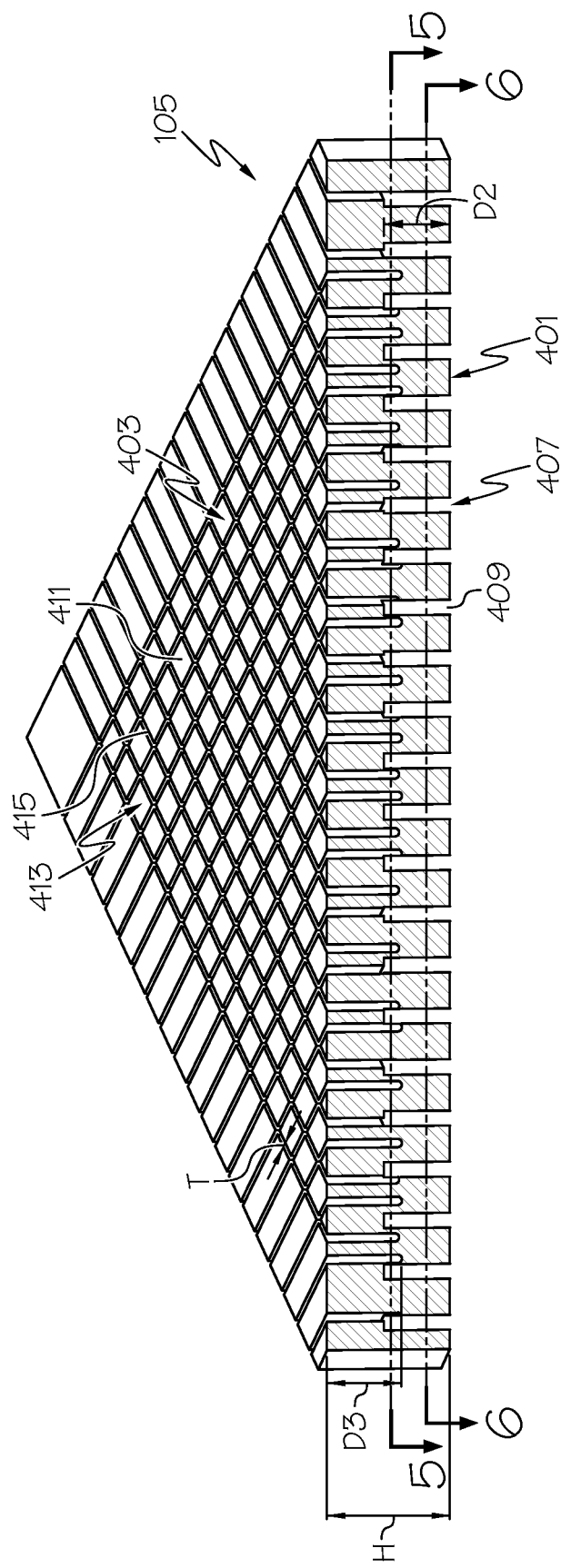
FIG. 4 is a cross-sectional view of the example first discharge member of the example die body apparatus of FIG. 1.

Referring to FIG. 4, the first discharge member 105 can include a first face 401 and a second face 403. As shown, each face 401, 403 may be substantially planar and parallel with one another although other nonplanar and/or nonparallel configurations may be provided in further examples. The first discharge member 105 can include a second set of elongated feed channels 407 that each include an elongated length "L2" (see FIG. 6) extending along the first face 401 of the first discharge member 105, a width "W2" extending transverse to the corresponding elongated length "L2", and a depth "D2" from the first face 401 of the first discharge member 105.

Each of the elongated feed channels 407 includes an elongated opening 409 intersecting the first face 401 of the first discharge member 105 and extending along the corresponding length "L2" of the feed channel 407. Indeed, the elongated opening 409 can intersect the first face 401 such that the elongated openings 409 are open to the first face 401. As such, batch material may freely pass through elongated openings 409 in the first face 401 and into the elongated feed channels 407.

As with the elongated feed channels 207 of the base member 103, the elongated feed channels 407 of the first discharge member 105 can likewise have the same shape and/or other characteristics in further examples. For instance, the elongated feed channels 407 may optionally include lengths "L2" that are identical or substantially identical to the respective lengths "L1" of the corresponding elongated feed channels 207 of the base member 103. Likewise, the elongated feed channels 407 may optionally include widths "W2" that are identical or substantially identical to the respective widths "W1" of the corresponding elongated feed channels 207. As illustrated, in some examples, the elongated feed channels 407 may be substantially straight although other profiles may be provided in further examples. Thus, as illustrated, in some examples, each elongated feed channel 207, 407 of the first set of elongated feed channels 207 and the second set of elongated feed channels 407 may be substantially straight. Alternatively, the elongated feed channels may comprise curvilinear shapes (e.g., sinusoidal shapes), stepped shapes or other profile shapes. Furthermore, as shown, the first set of elongated feed channels 207 comprises substantially parallel elongated feed channels 207 and the second set of elongated feed channels 407 comprises substantially parallel elongated feed channels 407.

In some instances, the profile, orientation and other characteristics of the elongated feed channels 407 may be provided to accommodate the particular elongated channel profile, orientation and other characteristics of the elongated feed channels 207 of the base member 103. Indeed, in some examples, the first discharge member 105 may be configured to be bonded, or actually bonded, with respect to the base member 103 such that each elongated opening 209 of a plurality of the elongated feed channels 207 of the first set of elongated feed channels 207 is aligned with a corresponding elongated opening 409 of the elongated feed channels 407 of the second set of elongated feed channels 407 to provide a plurality of elongated feed passages 107 (see FIG. 1) placing a plurality of the feed holes 205 in fluid communication with a first honeycomb network 413 of discharge slots 415 discussed more fully below.

Alignment may occur between two elongated feed channels 207, 407 with elongated openings 209, 409 of the corresponding pair of elongated feed channels 207, 407 having substantially identical widths W1, W2 or different widths. In the illustrated example, the widths W1, W2 are substantially identical and alignment may be achieved with substantially complete alignment by placing substantially the entire width of one elongated feed channel extends across substantially the entire width of the other channel. In further examples, alignment may be achieved with partial alignment wherein the width of one elongated feed channel extends partially across the width of the other elongated feed channel. In further examples, the widths W1, W2 may not be identical with one another. In such examples, the base member 103 and the first discharge member 105 may be mounted together with a certain relative lateral tolerance. As such, alternative shifted positions are possible wherein alignment can still achieve substantially complete alignment wherein the entire smaller width extends across part of the larger width. In further examples, alignment can be achieved with partial alignment wherein only part of the width of the smaller width extends across part of the larger width.

The first discharge member 105 may be bonded to the base member 103 in a wide variety of ways. For example, the first face 401 of the first discharge member 105 may be bonded to the second face 203 of the base member 103 with an adhesive (e.g. epoxy), fasteners, etc. In further examples, the first face 401 of the first discharge member 105 may be integrally bonded to the second face 203 of the base member 103. In one example, integral bonding may be achieved by sintering. In further examples, the first face 401 of the first discharge member may be integrally bonded by welding with a weld bead or cold welded (i.e., without substantially changing the microstructure that may otherwise occur when melting materials during other welding techniques). In one particular example of integral bonding, the first face 401 of the first discharge member 105 may be diffusion bonded to the second face 203 of the base member 103.

Referring back to FIG. 4, the first discharge member 105 can further include a first array of pins 411 that are spaced apart to define a first honeycomb network 413 of discharge slots 415 intersecting the second face 403 of the first discharge member 105. As the discharge slots 415 intersect the second face 403, the discharge slots 415 are open at the second face 403 such that batch material may flow through the discharge slots to be discharged from the second face 403 of the first discharge member 105. The second set of elongated feed channels 407 are in fluid communication with the first honeycomb network 413 of discharge slots 415. For example, as shown in FIG. 4, the discharge slots 415 may extend a depth "D3" below the second face 403 that is deep enough to intersect with the otherwise closed ends of the elongated feed channels 407. Indeed, as shown, the elongated feed channels 407 can extend the depth "D2" from the first face 401 while the discharge slots 415 can extend a depth "D3" from the second face 403. The intersection between the discharge slots 415 and the elongated feed channels 407 can be provided by constructing the first discharge member 105 with a height "H" that is less than the sum of the depths of the discharge slots and the elongated feed channels (i.e., H<D2+D3). The overlapped intersection between the discharge slots 415 and the elongated feed channels 407 can allow batch material to travel along the elongated feed channels 407 and pass into the discharge slots 415 to be subsequently passed through the open ends of the discharge slots at the second face 403 of the first discharge member 105.

Figure 11:
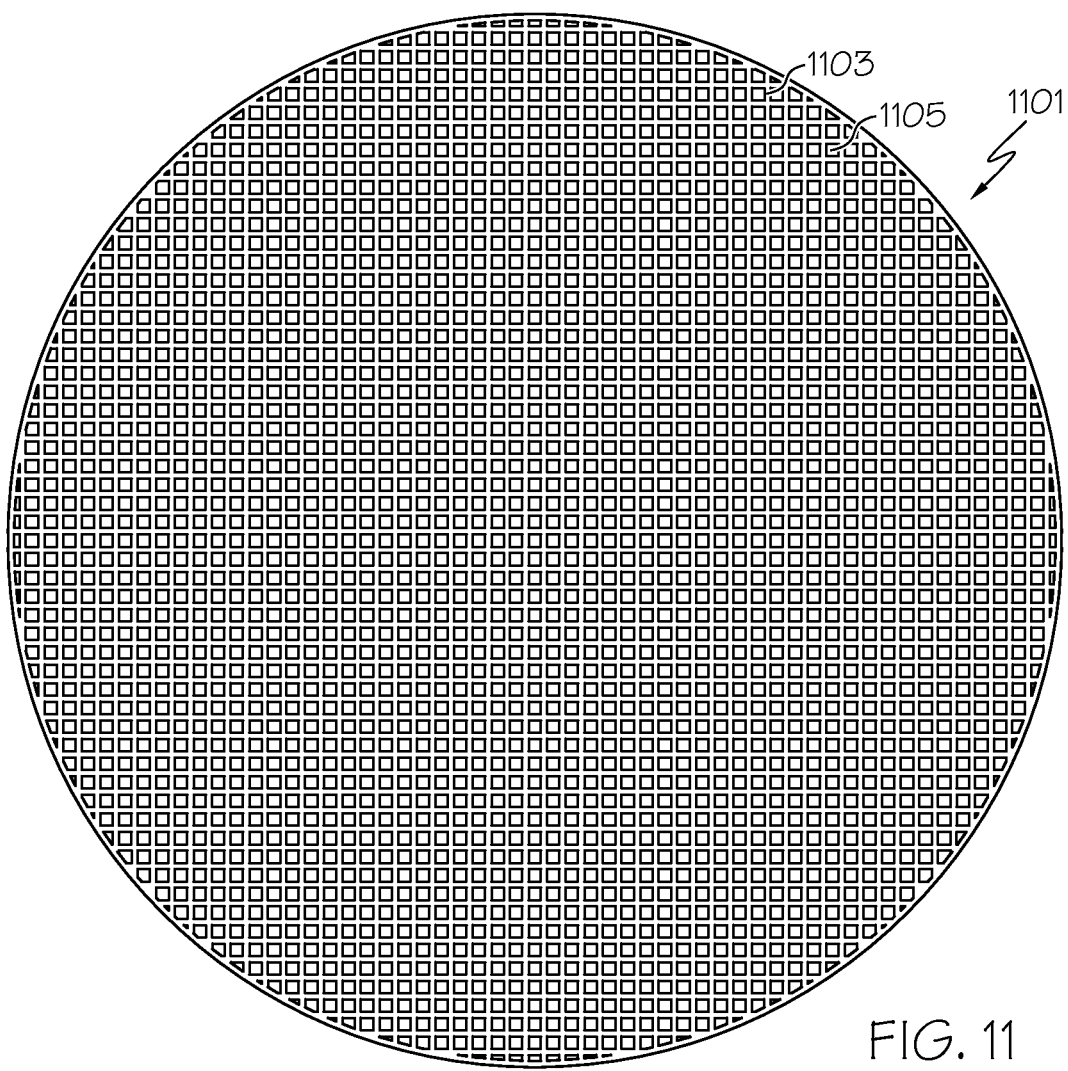
FIG. 11 is a cross-sectional view of an example honeycomb body extruded from the die body apparatus taken along line 11-11 of FIG. 9.

The first discharge member 105 illustrates just one example of a honeycomb network 413 of discharge slots 415 and one example of pins 411 that may be used in accordance with aspects of the disclosure. For instance, as shown, the discharge slots 415 can all include the same thickness "T" as shown in FIG. 4. Providing all of the discharge slots 415 with the same thickness "T" can be used to produce the honeycomb body 1101 with walls 1103 that have substantially identical wall thicknesses as shown in FIG. 11. Furthermore, as shown in FIG. 4, the discharge slots 415 can be arranged to provide an array of pins 411 that are all substantially the same square shape. In further examples other honeycomb networks may be provided with alternative discharge slot and/or pin configurations. For instance, the pins may comprise other polygonal shapes, i.e., in the shape of a triangle, rectangle (e.g., square), pentagon, hexagon, heptagon, octagon, etc. Furthermore, the pins may have the same size or may be different sizes (e.g., different sizes that are geometrically similar to one another).

In some examples, each elongated feed channel 407 of the second set of elongated feed channels 407 can extend at an acute angle with respect to a direction of the discharge slots. Providing an acute angle can allow intersection of the elongated feed channel 407 with multiple discharge slots of the honeycomb network of discharge slots. For instance, as shown, in FIG. 5, each elongated feed channel 407 of the second set of elongated feed channels 407 extends an acute angle "A1", "A2" relative to a direction 501, 502 of each of the discharge slots 415 of the first honeycomb network 413 of discharge slots 415. In the illustrated configuration, each pin 411 of the first array of pins 411 includes a substantially square cross-sectional shape and the acute angle "A1", "A2" are each approximately 45°. Providing acute angles of 45° can allow dividing (e.g., bisecting) of the square shaped pins across diagonally oriented corners of the square shaped pins or along a parallel direction to the diagonally oriented corners. As such, batch material can efficiently pass through the intersection from the elongated feed channels 407 for desirable distribution into the honeycomb network 413 of discharge slots 415.

Figure 7:
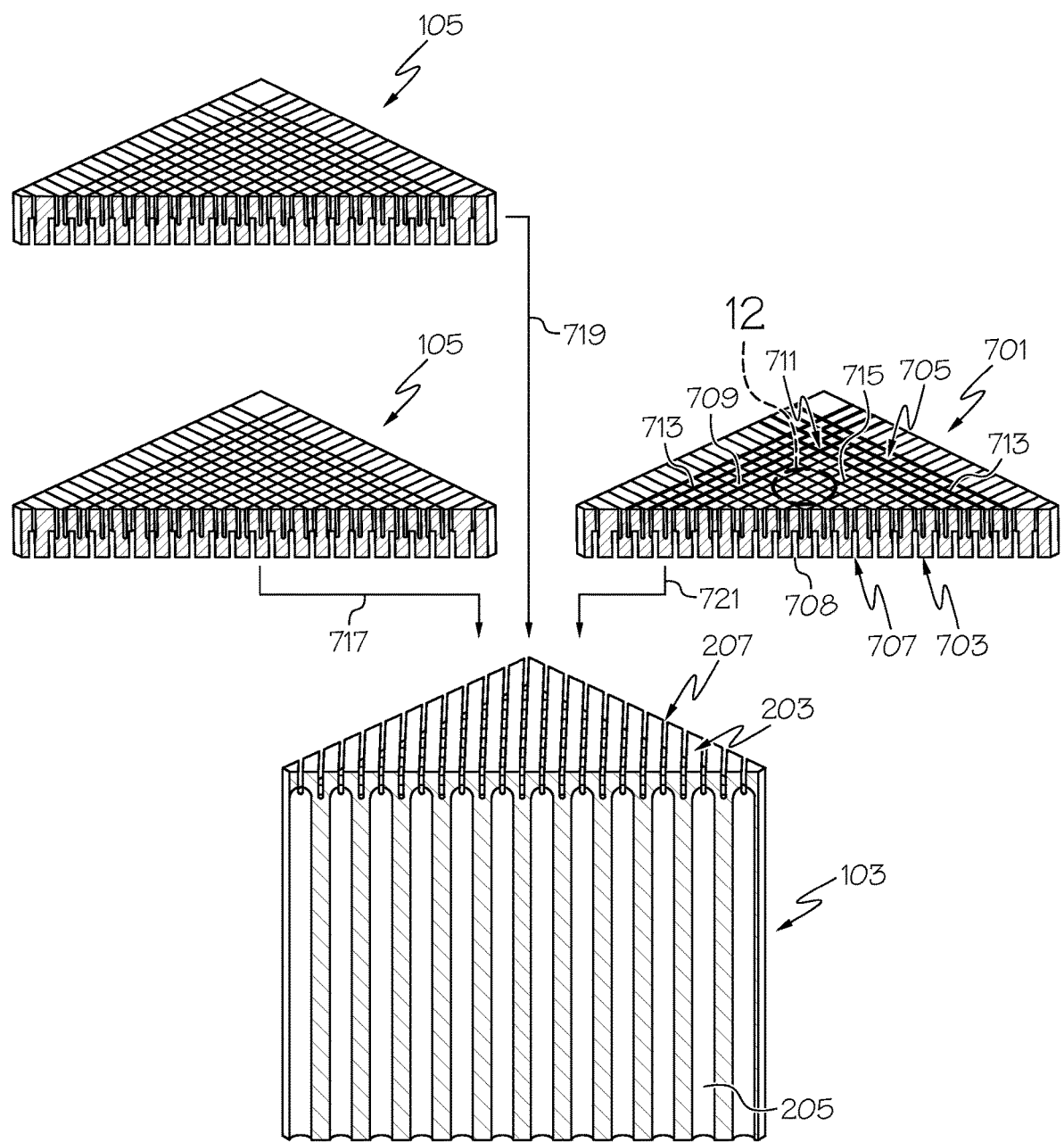
FIG. 7 illustrates example step of electing one of the plurality of discharge members for bonding to a base member in a method of assembling a die body apparatus in accordance with aspects of the disclosure.

Aspects of the disclosure provide a plurality of discharge members having identical or different configurations. In such examples, a common universal base may be provided with various alternative discharge members that may be subsequently coupled to the base depending on the particular application. In such examples, inventory may be simplified since only one type of base may need to be provided wherein alternative discharge members may be selected on site to bond with the base to provide a desired die body apparatus configuration. As shown in FIG. 7, for example, one may select from a supply of identical first discharge members 105 having an identical configuration. Alternatively, one may select from another discharge member having a different configuration. For instance, the different configuration may have different die pin shapes, sizes and/or different discharge slot thicknesses. In some examples, the shapes of the die pins may be different to provide a honeycomb body with a different through channel shape. In further examples, the sizes of the die pins may be changed. For instance, a larger die pin size may be provided to reduce the cell density of the resulting extruded honeycomb body. Alternatively, a smaller die pin size may be provided to increase the cell density of the resulting extruded honeycomb body. In further examples, different shapes or sizes of die pins and/or slots may be provided in the same discharge member to provide honeycomb bodies with different features.

By way of example, FIG. 7 also shows that one may select an alternative second discharge member 701 that has a different configuration of discharge slots than the first discharge member 105. As such, in some examples, the first and second honeycomb network 413, 711 of discharge slots 415, 713, 715 may optionally have substantially different configurations. For instance, as shown, the second discharge member 701 including a first face 703, a second face 705, a third set of elongated feed channels 707 that each include an elongated length extending along the first face 703 of the second discharge member 701, a width extending transverse to the corresponding elongated length, a depth from the first face 703 of the second discharge member 701, and an elongated opening 708 intersecting the first face 703 of the second discharge member 701 and extending along the corresponding length of the elongated feed channel. In some examples, the third set of elongated feed channels 707 may be substantially identical to the second set of elongated feed channels 407. In fact, in some examples, every alternative discharge member may have substantially the same elongated feed channel arrangement such that they are equally able to mate, in a universal manner, with the first set of elongated feed channels 207 of the base member 103 to produce elongated feed passages similar or identical to the elongated feed passages 107 shown in FIG. 1.

Figure 12:
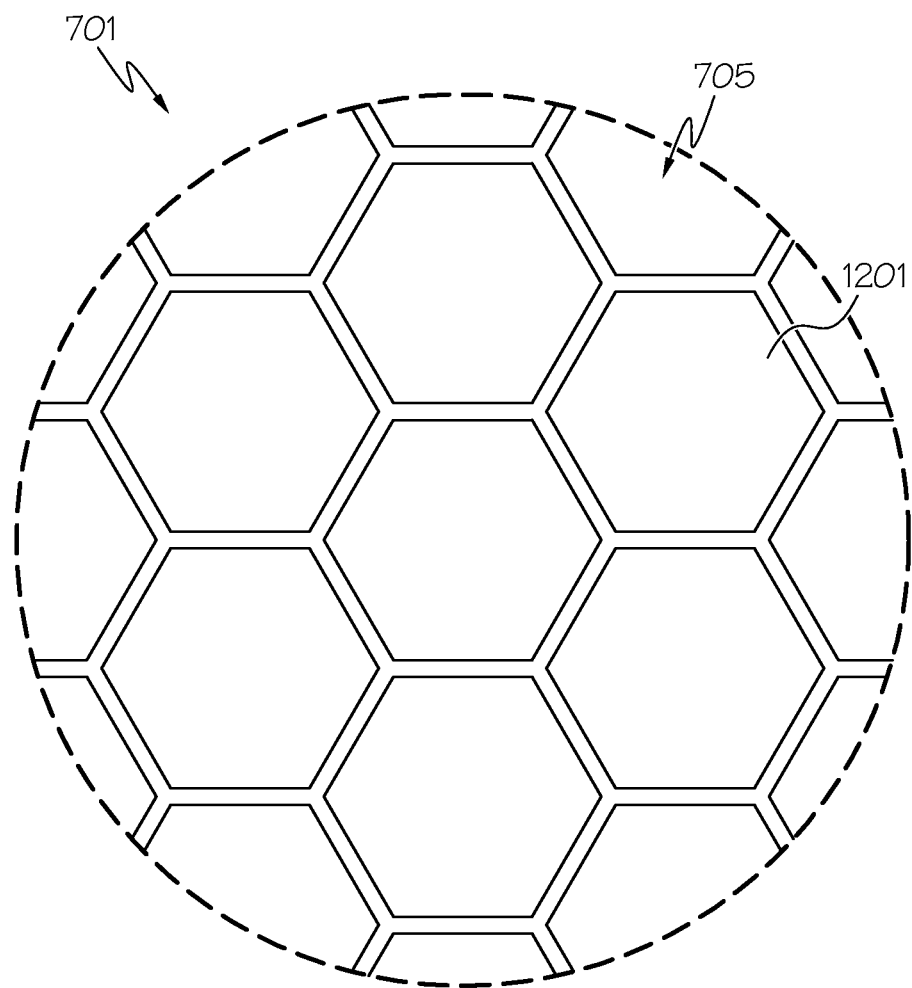
FIG. 12 is an enlarged view of a portion of a discharge member taken at view 12 of FIG. 7 illustrating an alternative pin shape.

Although the first face 703 of the second discharge member 701 (or other alternative discharge members) may have a similar or identical elongated feed channel configuration to mate with the elongated feed channels 207 of the base member 103, the second face of the discharge members may have the same or different features for the honeycomb network of discharge slots and/or die pins. For instance, the illustrated second discharge member 701 includes a first array of pins 709 that are spaced apart to define a second honeycomb network 711 of discharge slots 713, 715 intersecting the second face 705 of the second discharge member 701, wherein the third set of elongated feed channels 707 are in fluid communication with the second honeycomb network 711 of discharge slots 713, 715. In the illustrated example, the outer discharge slots 713 may have a greater thickness than the inner discharge slots 715. As such, a honeycomb body may be extruded with relatively thicker walls toward the outer periphery of the honeycomb body than the central portion of the honeycomb body. Providing relatively thicker walls can enhance strength at the outer periphery to resist damage from external forces impacting the outer peripheral skin of the honeycomb body. In another example, as shown in the enlarged view 12 of the second discharge member 701 shown in FIG. 12, an alternative configuration of pins 1201 with a shape of a hexagon, although other shapes such as triangular, rectangular (e.g., square), pentagon, heptagon, octagon, circular, elliptical, or other shapes and combinations thereof may be provided in further examples.

The elongated feed channels and the honeycomb network of discharge slots may be fabricated with a wide range of techniques. For instance, the elongated feed channels and/or honeycomb network of discharge slots may be fabricated by Electrical discharge machining "EDM" such as wire EDM, plunge EDM, or other EDM techniques. In further examples, the elongated feed channels and/or the honeycomb network of discharge slots may be fabricated by grinding wheels or other machining techniques.

Like the first discharge member 105, the second discharge member 701 is also configured to be bonded or actually bonded with respect to the base member 103 such that each elongated opening 209 of a plurality of the elongated feed channels 207 of the first set of elongated feed channels 207 is aligned with a corresponding elongated opening of the elongated feed channels 707 of the third set of elongated feed channels 707 to provide a plurality of elongated feed passages placing a plurality of the feed holes 205 in fluid communication with the second honeycomb network 711 of discharge slots 713, 715.

Similar or identical to the first discharge member 105, the second discharge member 701 may be bonded to the base member 103 in a wide variety of ways. For example, the first face 703 of the second discharge member 701 may be bonded to the second face 203 of the base member 103 with an adhesive (e.g. epoxy), fasteners, etc. In further examples, the first face 703 of the second discharge member 701 may be integrally bonded to the second face 203 of the base member 103. For example, the first face 703 of the second discharge member may be welded with a weld bead or cold welded. In one particular example of integral bonding, the first face 703 of the second discharge member 701 may be diffusion bonded to the second face 203 of the base member 103.

Figure 8:
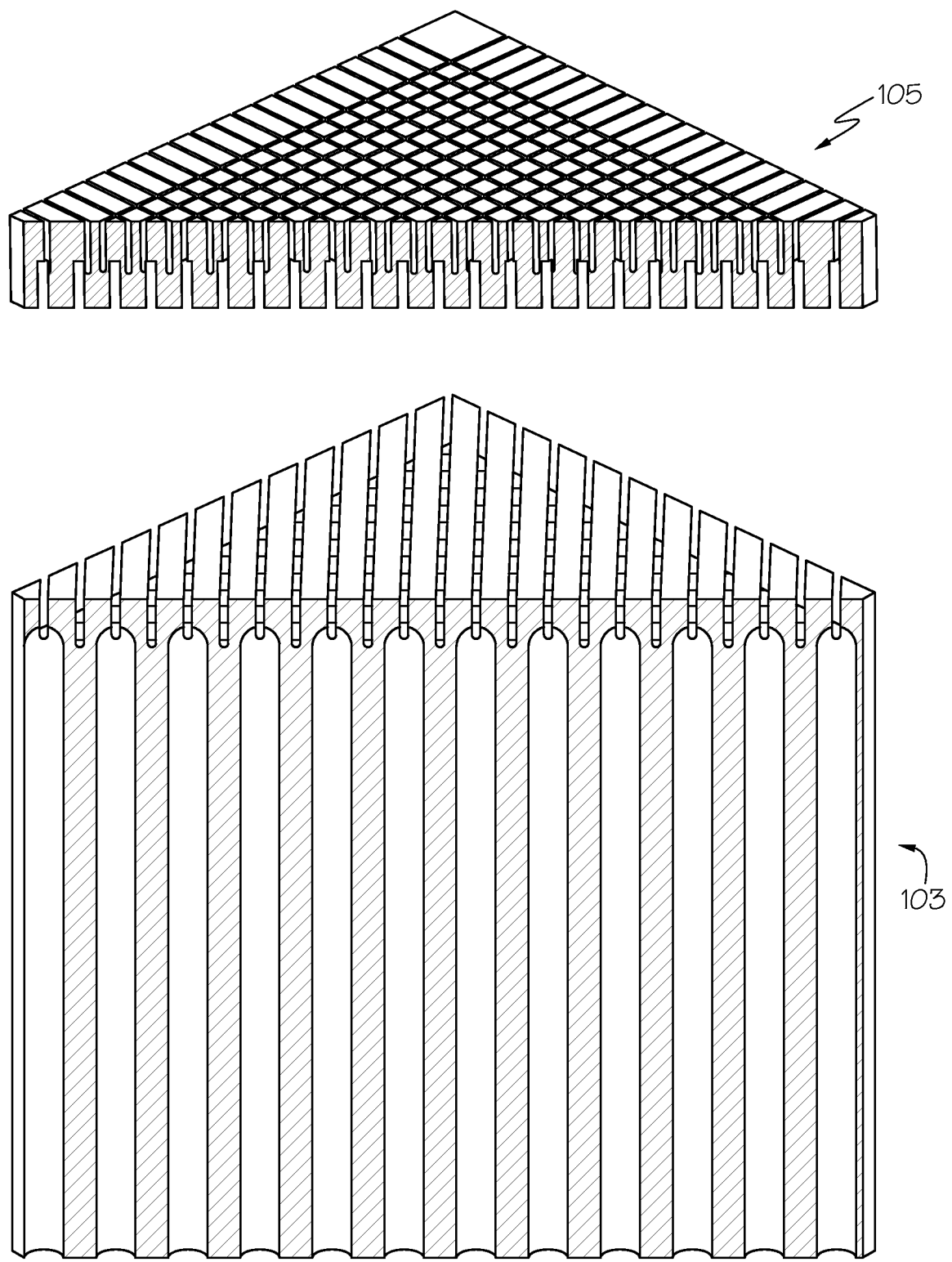
FIG. 8 illustrates example step of aligning a discharge member for bonding to a base member during a method of assembling a die body apparatus in accordance with aspects of the disclosure.

Methods of assembling the die body apparatus 101 will now be described with the understanding that other similar or identical method steps may be carried out to produce other die body apparatus. With initial reference to FIG. 8, the method may provide the base member 103 that may be identical and include features discussed with respect to FIGS. 2-3 above. Indeed, as discussed previously, the base member 103 can include the first face 201, the second face 203, and the plurality of feed holes 205 intersecting the first face 201. The base member 103 can further include the first set of elongated feed channels 207 that each include the elongated length "L1" extending along the second face 203, the width "W1" extending transverse to the length "L1", the depth "D1" from the second face 203, and the elongated opening 209 intersecting the second face 203 and extending along the length "L1" of the feed channel 207. As discussed previously, each of the elongated feed channels 207 of the first set of elongated feed channels 207 is in fluid communication with a corresponding set of the plurality of feed holes 205 that are intersected by the elongated feed channel 207.

Turning back to FIG. 8, the method may also provide the at least one discharge member (e.g., the illustrated first discharge member 105, the second discharge member 701, and/or other discharge members) may be identical and include features discussed with respect to FIGS. 4-7 above.

Figure 5:
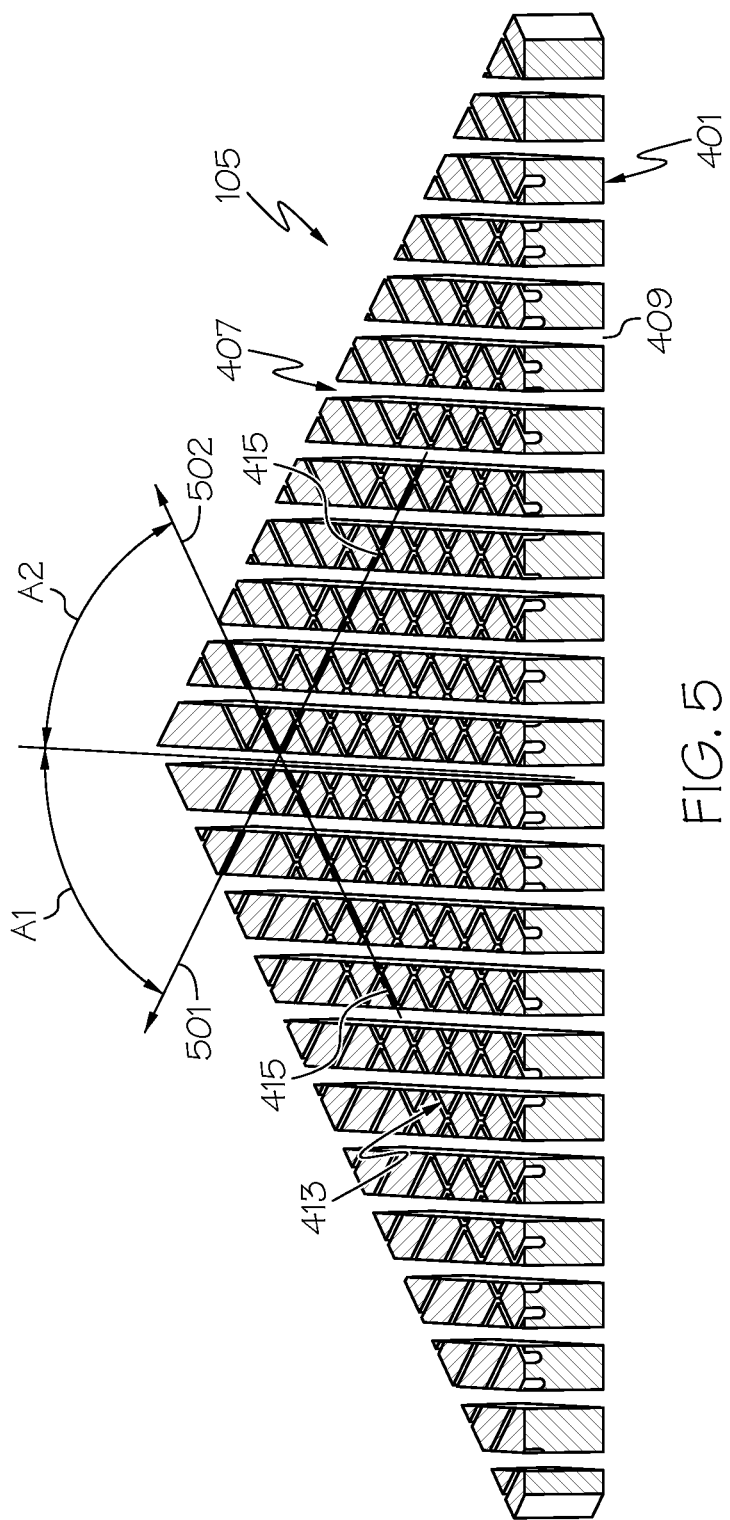
FIG. 5 is a cross-sectional view of the example first discharge member along line 5-5 of FIG. 4.
Figure 6:
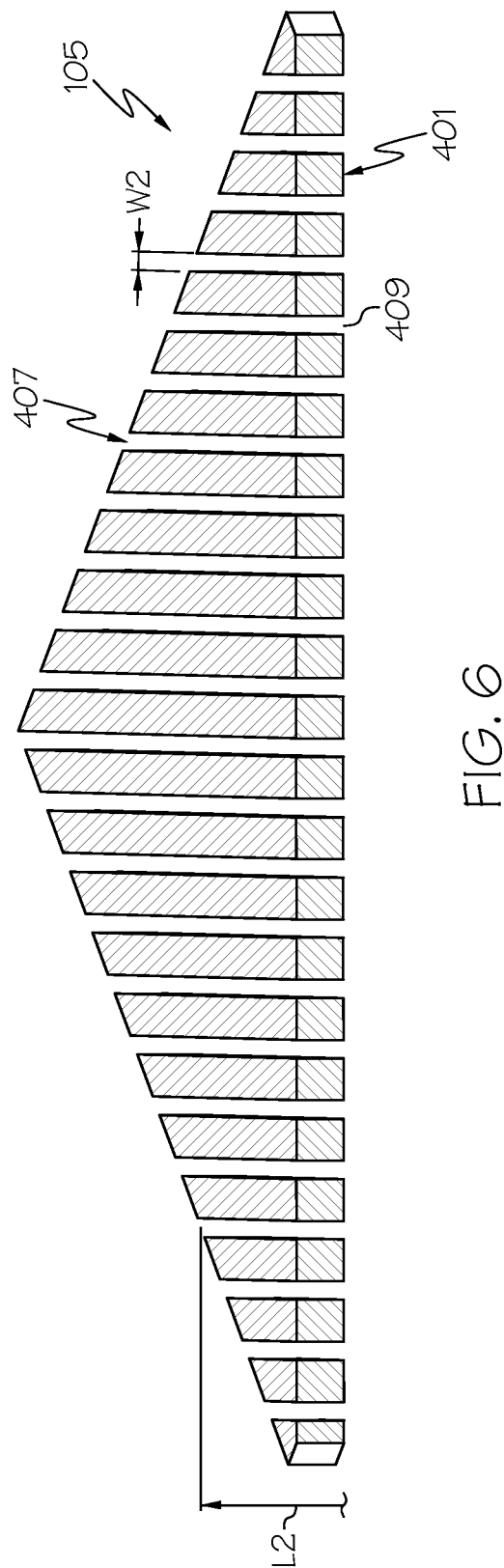
FIG. 6 is a cross-sectional view of the example first discharge member along line 6-6 of FIG. 4.

In one example, with particular reference to FIGS. 4-6, the at least one discharge member includes the first discharge member 105 with the first face 401 and the second face 403. The first discharge member 105 can further include the second set of elongated feed channels 407 that each include the elongated length "L2" extending along the first face 401 of the at least one discharge member, the width "W2" extending transverse to the corresponding elongated length "L2", the depth "D2" from the first face 401 of the first discharge member 105, and the elongated opening 409 intersecting the first face 401 of the first discharge member 105 and extending along the corresponding length "L2" of the feed channel 407. As discussed previously, the at least one discharge member 105 can further the array of pins 411 that are spaced apart to define the honeycomb network 413 of discharge slots 415 intersecting the second face 403 of the first discharge member 105. As further mentioned previously, the second set of elongated feed channels 407 may be placed in fluid communication with the honeycomb network 413 of discharge slots 415.

In another example, with particular reference to FIG. 7, the at least one discharge member includes the second discharge member 701 with the first face 703 and the second face 705. The second discharge member 701 can further include the second set of elongated feed channels 707 that each include the elongated length extending along the first face 703 of the first discharge member, the width extending transverse to the corresponding elongated length, the depth from the first face 703 of the second discharge member 701, and the elongated opening 708 intersecting the first face 703 of the second discharge member 701 and extending along the corresponding length of the feed channel 707. As discussed previously, the second discharge member 701 can further the array of pins 709 that are spaced apart to define the honeycomb network 711 of discharge slots 713, 715 intersecting the second face 705 of the second discharge member 701. As further mentioned previously, the second set of elongated feed channels 707 may be placed in fluid communication with the honeycomb network 711 of discharge slots 713, 715.

While the at least one discharge member may be provided as a single discharge member (e.g., the first discharge member 105 or the second discharge member 701), in further examples, the at least one discharge member may include a plurality of discharge members. In examples with a plurality of discharge members, the method can include the step of selecting one of the plurality of discharge members for bonding with the base member.

As shown in FIG. 7, the at least one discharge member may be provided as a plurality of identical first discharge members 105. As such, as shown by arrows 717, 718, methods of selecting can include the step of selecting one of the plurality of identical discharge members for bonding with the base member. In addition or alternatively, at least two of the discharge members the honeycomb network of discharge slots of at least two of the plurality of discharge members have substantially different configurations. For instance, as discussed previously, the first discharge member 105 includes the honeycomb network 413 of discharge slots that have a substantially different configuration than the honeycomb network 711 of discharge slots of the second discharge member 701. As such, as shown by arrows 717, 719, 721 in FIG. 7, the method of selecting can include selecting one of the plurality of discharge members 105, 701 with a selected honeycomb network discharge slot configuration.

As such, in some examples, the base member 103 may be provided as a universal base member that may be attached with a wide range of alternative discharge members having an identical or different honeycomb network discharge slot configuration. As such, only a single base member needs to be provided that can simplify and reduce inventory requirements. Moreover, a plurality of alternative honeycomb network discharge slot configurations may be provided for selection based on the intended application.

The method can further include the step of bonding the selected discharge member of the at least one discharge member (e.g., the first discharge member 105 or the second discharge member 701) with respect to the base member 103. For example, by way of example, with reference to FIG. 1, the first discharge member 105 is bonded with respect to the base member 103 with each elongated opening 209 of the plurality of the elongated feed channels 207 of the first set of elongated feed channels 207 being aligned with a corresponding elongated opening 409 of the elongated feed channels of the second set of elongated feed channels 407 to provide a plurality of elongated feed passages 107 placing the plurality of the feed holes 205 in fluid communication with the honeycomb network 413 of discharge slots 415.

As discussed previously, various bonding techniques may be provided. For instance, the step of bonding can include integrally bonding the first face 401 of the selected discharge member to the second face 203 of the base member 103. In another example, the method can comprise the step of integrally bonding by diffusion bonding the first face 401 of the selected discharge member to the second face 203 of the base member 103.

Methods of extruding ceramic or ceramic-forming batch material into the honeycomb body 1101 illustrated in FIG. 11 will now be described. The method can include assembling the die body apparatus as discussed above. For instance, the die body apparatus can be assembled by selecting from a single or multiple discharge members (e.g., the first discharge member 105 and/or the second discharge member 701). The method can then include the step of bonding the selected discharge member of the at least one discharge member with respect to the base member 103 to provide a plurality of elongated feed passages 107 placing a plurality of the feed holes 205 of the base member 103 in fluid communication with the selected honeycomb network of discharge slots.

As discussed above, the at least one discharge member can include a plurality of discharge members, and the method can optionally include the step of selecting one of the plurality of discharge members for bonding. As further discussed above, in one particular example, the honeycomb network of discharge slots of at least two of the plurality of discharge members may have substantially different configurations, and wherein the step of selecting includes selecting one of the plurality of discharge members with a selected honeycomb network discharge slot configuration.

Figure 9:
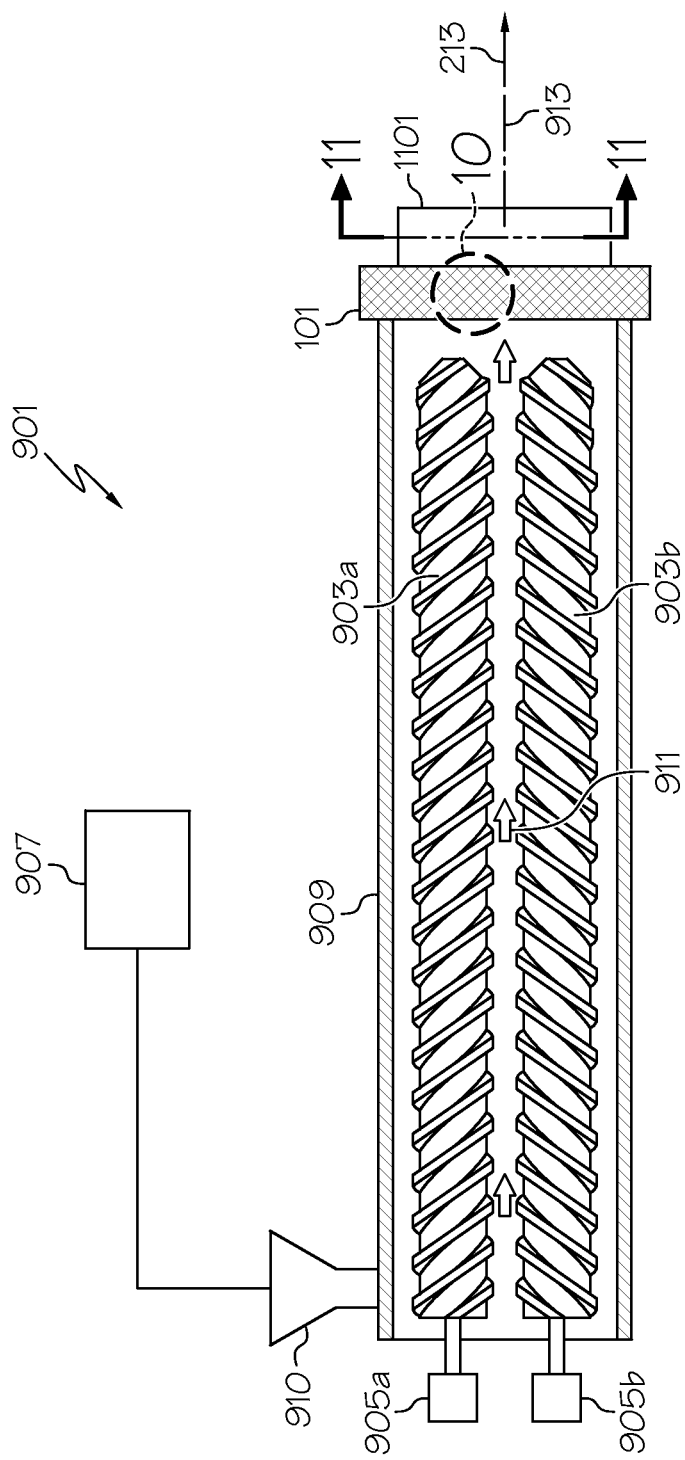
FIG. 9 schematically illustrates an example method of extruding ceramic or ceramic-forming batch material into a honeycomb body with the example die body apparatus of FIG. 1.

As shown schematically in FIG. 9, the method can further include the step of extruding a quantity of batch material through the die body apparatus into an extruded honeycomb body with a honeycomb network of channels. In examples, where alternative discharge members are available with different honeycomb network configurations, the desired discharge member may be preselected wherein the step of extruding can extrude the honeycomb body 1101 with a preselected configuration of the honeycomb network of channels 1105.

FIG. 9 schematically illustrates just one example extrusion apparatus 901 that may be used in accordance with aspects of the disclosure. The extrusion apparatus 901 depicts a twin-screw extruder including twin screws 903a, 903b configured to be rotated by respective motors 905a, 905b to mix and compress the ceramic or ceramic-forming batch of material 907 within a cylinder 909. Indeed, the ceramic or ceramic-forming batch of material 907 can be introduced by a hopper 910 into a first end of the cylinder 909. Next, the rotating twin screws 903a, 903b can mix the batch material 907 while driving the batch material along path 911 toward the die body apparatus 101. The cylinder 909 includes an extrusion axis 913 wherein the honeycomb body 1101 can be extruded from the die body apparatus 101 along the extrusion direction 213 substantially parallel to the extrusion axis 913.

Figure 10:
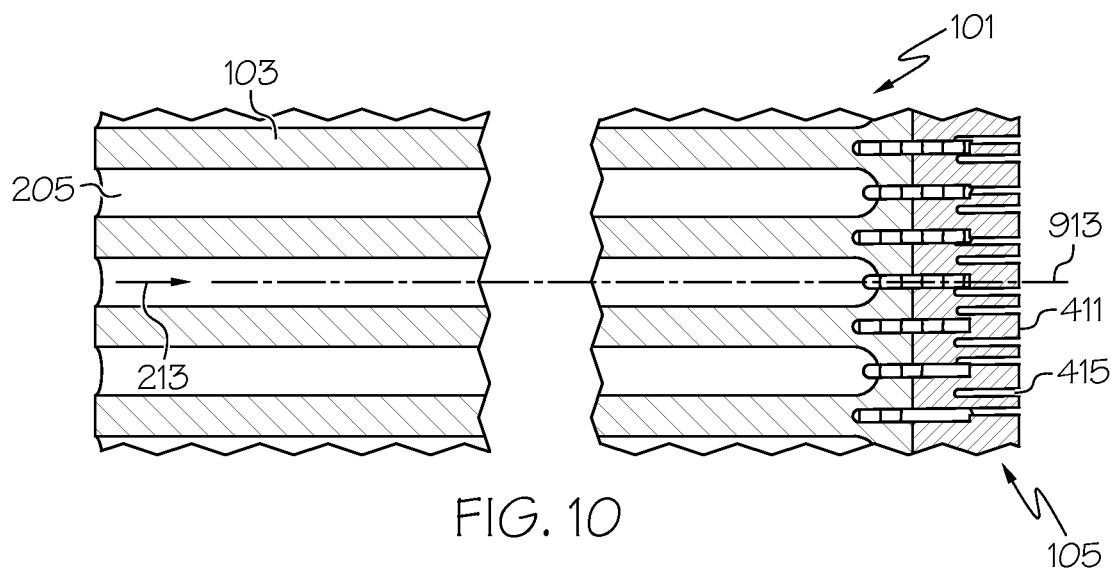
FIG. 10 is an enlarged cross-sectional view of portions of the die body apparatus taken at view 10 of FIG. 9.

FIG. 10 is an enlarged cross sectional view of the example die body apparatus 101 (shown in FIG. 1) that may be used in accordance with aspects of the disclosure. As shown, the feed holes 205 of the base member 103 feed batch material along the extrusion direction 213 along the extrusion axis 913, toward the plurality of pins 411. The pins 411 are spaced apart from one another to define the discharge slots 415 designed to form the walls 1103 of the honeycomb body 1101 (FIG. 11). The pins 411 shown in FIG. 1 can have a square shape to define square-shaped channels 1105 (FIG. 11) although, as mentioned previously, other die pin configurations (e.g., hexagonal, octagonal, etc.) can be selected depending on the desired channel configuration.

As discussed previously, the two piece construction of the die body apparatus 101 help manage inventory requirements and can also allow preselection of a desired discharge member to allow selection of the desired honeycomb network configuration depending on the requirements of a particular application. Moreover, it is contemplated, that the two-piece construction can also facilitate replacement of the discharge member without requiring discarding the entire die body apparatus that may otherwise be required with single piece configurations. Indeed, if the discharge member is damaged or clogged beyond repair, the discharge member may be cut away from the base member. The undamaged base member may be recycled by bonding to a new discharge member with the same or a different configuration. As such, the material costs and expense with creating the base member again may be avoided, wherein only the damage discharge member may need to be replaced. Likewise, if the base member is damaged, the base member may be replaced while recycling the working discharge member. In some examples, separating the base member from the discharge member may be carried out by a grinding wheel, EDM wire, or other technique that cuts across the elongated feed passages 107. As the elongated feed passages 107 are universal in nature, a new base member and/or discharge member may be easily mounted to the recycled base member or discharge member wherein corresponding elongated feed channels are again matched together prior to bonding the base member and the discharge member together.

The present application can achieve various aspects, some of which are disclosed below.

In accordance with a first aspect, a die body apparatus is disclosed that is configured to extrude a honeycomb body. The die body apparatus comprises a base member including a first face, a second face, a plurality of feed holes intersecting the first face, and a first set of elongated feed channels. The first set of elongated feed channels each include an elongated length extending along the second face, a width extending transverse to the length, a depth from the second face, and an elongated opening intersecting the second face and extending along the length of the feed channel. Each of the elongated feed channels of the first set of elongated feed channels is in fluid communication with a corresponding set of the plurality of feed holes that are intersected by the elongated feed channel. The die body apparatus further includes a first discharge member including a first face, a second face, a second set of elongated feed channels that each include an elongated length extending along the first face of the first discharge member, a width extending transverse to the corresponding elongated length, a depth from the first face of the first discharge member, and an elongated opening intersecting the first face of the first discharge member and extending along the corresponding length of the feed channel. The first discharge member further includes a first array of pins that are spaced apart to define a first honeycomb network of discharge slots intersecting the second face of the first discharge member. The second set of elongated feed channels are in fluid communication with the first honeycomb network of discharge slots. The die body apparatus is provided wherein the first discharge member is configured to be bonded with respect to the base member such that each elongated opening of a plurality of the elongated feed channels of the first set of elongated feed channels is aligned with a corresponding elongated opening of the elongated feed channels of the second set of elongated feed channels to provide a plurality of elongated feed passages placing a plurality of the feed holes in fluid communication with the first honeycomb network of discharge slots.

In one example of the first aspect, each elongated feed channel of the first set of elongated feed channels and the second set of elongated feed channels is substantially straight. In a particular example, each elongated feed channel of the second set of elongated feed channels extends at an acute angle relative to a direction of each of the discharge slots of the first honeycomb network of discharge slots. In one example, each pin of the first array of pins includes a substantially square cross-sectional shape and the acute angle is approximately 45°.

In a further example of the first aspect, each pin of the first array of pins includes a cross-sectional shape selected from a group consisting of: a triangle, rectangle, pentagon, hexagon, heptagon, and octagon.

In another example of the first aspect, the first set of elongated feed channels comprises substantially parallel elongated feed channels and the second set of elongated feed channels comprises substantially parallel elongated feed channels.

In yet another example of the first aspect, a corresponding pair of elongated feed channels define each elongated feed passage, wherein the elongated openings of the corresponding pair of elongated feed channels include substantially identical widths.

In a further example of the first aspect, first discharge member is bonded with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the first honeycomb network of discharge slots. In one particular example, the first face of the first discharge member is integrally bonded to the second face of the base member. In one example, the first face of the first discharge member is diffusion bonded to the second face of the base member.

In still a further example of the first aspect, a second discharge member includes a first face, a second face, a third set of elongated feed channels that each include an elongated length extending along the first face of the second discharge member, a width extending transverse to the corresponding elongated length, a depth from the first face of the second discharge member, and an elongated opening intersecting the first face of the second discharge member and extending along the corresponding length of the elongated feed channel. The second discharge member further includes a first array of pins that are spaced apart to define a second honeycomb network of discharge slots intersecting the second face of the second discharge member. The third set of elongated feed channels is in fluid communication with the second honeycomb network of discharge slots. The second discharge member is configured to be bonded with respect to the base member such that each elongated opening of a plurality of the elongated feed channels of the first set of elongated feed channels is aligned with a corresponding elongated opening of the elongated feed channels of the third set of elongated feed channels to provide a plurality of elongated feed passages placing a plurality of the feed holes in fluid communication with the second honeycomb network of discharge slots. In one particular example, the second discharge member is bonded with respect to the base member with each elongated opening of a plurality of the elongated feed channels of the first set of elongated feed channels being aligned with a corresponding elongated opening of the elongated feed channels of the third set of elongated feed channels to provide a plurality of elongated feed passages placing a plurality of the feed holes in fluid communication with the second honeycomb network of discharge slots. In another particular example, the first face of the second discharge member is integrally bonded to the second face of the base member. In another example, the first face of the second discharge member is diffusion bonded to the second face of the base member. In another example, the first and second honeycomb network of discharge slots have substantially different configurations.

The first aspect can be provided alone or in combination with one or any combination of the examples of the first aspect discussed above.

In accordance with a second aspect, a method of assembling a die body apparatus is provided. The die body includes a base member including a first face, a second face, a plurality of feed holes intersecting the first face, and a first set of elongated feed channels that each include an elongated length extending along the second face, a width extending transverse to the length, a depth from the second face, and an elongated opening intersecting the second face and extending along the length of the feed channel. Each of the elongated feed channels of the first set of elongated feed channels is in fluid communication with a corresponding set of the plurality of feed holes that are intersected by the elongated feed channel. The die body further includes at least one discharge member including a first face, a second face, a second set of elongated feed channels that each include an elongated length extending along the first face of the at least one discharge member, a width extending transverse to the corresponding elongated length, a depth from the first face of the at least one discharge member, and an elongated opening intersecting the first face of the at least one discharge member and extending along the corresponding length of the feed channel. The at least one discharge member further includes an array of pins that are spaced apart to define a honeycomb network of discharge slots intersecting the second face of the at least one discharge member. The second set of elongated feed channels are in fluid communication with the honeycomb network of discharge slots. The method comprises the step (I) of bonding a selected discharge member of the at least one discharge member with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the honeycomb network of discharge slots.

In one example of the second aspect, the at least one discharge member includes a plurality of discharge members, and the method includes the step of selecting one of the plurality of discharge members for bonding during step (I). In one particular example, the honeycomb network of discharge slots of at least two of the plurality of discharge members have substantially different configurations, and wherein the step of selecting includes selecting one of the plurality of discharge members with a selected honeycomb network discharge slot configuration.

In another example of the second aspect, the step of bonding includes integrally bonding the first face of the selected discharge member to the second face of the base member. In one example, the step of integrally bonding comprises diffusion bonding the first face of the selected discharge member to the second face of the base member.

The second aspect can be provided alone or in combination with one or any combination of the examples of the second aspect discussed above.

In accordance with a third aspect, a method is provided for extruding batch material into a honeycomb body with a die body apparatus. The die apparatus comprises a base member including a first face, a second face, and a plurality of feed holes intersecting the first face. The base member further includes a first set of elongated feed channels that each include an elongated length extending along the second face, a width extending transverse to the length, a depth from the second face, and an elongated opening intersecting the second face and extending along the length of the feed channel. Each of the elongated feed channels of the first set of elongated feed channels is in fluid communication with a corresponding set of the plurality of feed holes that are intersected by the elongated feed channel. The die apparatus further includes at least one discharge member including a first face, a second face, a second set of elongated feed channels that each include an elongated length extending along the first face of the at least one discharge member, a width extending transverse to the corresponding elongated length, a depth from the first face of the at least one discharge member, and an elongated opening intersecting the first face of the at least one discharge member and extending along the corresponding length of the feed channel. The at least one discharge member further includes an array of pins that are spaced apart to define a honeycomb network of discharge slots intersecting the second face of the at least one discharge member, wherein the second set of elongated feed channels are in fluid communication with the honeycomb network of discharge slots. The method includes the step (I) of bonding a selected discharge member of the at least one discharge member with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the honeycomb network of discharge slots. The method further includes the step (II) of extruding a quantity of ceramic or ceramic-forming batch material through the die body apparatus into an extruded honeycomb body with a honeycomb network of channels.

In one example of the third aspect, the at least one discharge member includes a plurality of discharge members, and the method includes the step of selecting one of the plurality of discharge members for bonding during step (I). In one example, the honeycomb network of discharge slots of at least two of the plurality of discharge members have substantially different configurations, and wherein the step of selecting includes selecting one of the plurality of discharge members with a selected honeycomb network discharge slot configuration, wherein step (II) extrudes the honeycomb body with a preselected configuration of the honeycomb network of channels.

The third aspect can be provided alone or in combination with one or any combination of the examples of the third aspect discussed above.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A die body apparatus configured to extrude a honeycomb body, the die body apparatus comprising:
a base member including:
a first face,
a second face,
a plurality of feed holes intersecting the first face, and
a first set of elongated feed channels that each include:
an elongated length extending along the second face,
a width extending transverse to the length,
a first depth from the second face, and
an elongated opening intersecting the second face and extending along the length of the feed channel,
wherein each of the elongated feed channels of the first set of elongated feed channels is in fluid communication with a corresponding set of the plurality of feed holes that are intersected by the elongated feed channel; and
a first discharge member having a height and including:
a first face,
a second face,
a second set of elongated feed channels that each include:
an elongated length extending along the first face of the first discharge member,
a width extending transverse to the corresponding elongated length,
a second depth into the first discharge member from the first face of the first discharge member,
an elongated opening intersecting the first face of the first discharge member and extending along the corresponding length of the feed channel, and a first array of pins that are spaced apart to define a first honeycomb network of discharge slots intersecting the second face of the first discharge member, wherein the second set of elongated feed channels are in fluid communication with the first honeycomb network of discharge slots, wherein the discharge slots in the first honeycomb network each have a third depth into the first discharge member extending from the second face of the first discharge member, wherein the height of the first discharge member is less than a sum of the second depth of the elongated feed channels and the third depth of the discharge slots, and wherein the first discharge member is configured to be bonded with respect to the base member such that each elongated opening of a plurality of the elongated feed channels of the first set of elongated feed channels is aligned with a corresponding elongated opening of the elongated feed channels of the second set of elongated feed channels to provide a plurality of elongated feed passages placing a plurality of the feed holes in fluid communication with the first honeycomb network of discharge slots.

2. The die body apparatus of claim 1, wherein each elongated feed channel of the first set of elongated feed channels and the second set of elongated feed channels is substantially straight.

3. The die body apparatus of claim 1, wherein each elongated feed channel of the second set of elongated feed channels extends at an acute angle relative to a direction of each of the discharge slots of the first honeycomb network of discharge slots.

4. The die body apparatus of claim 1, wherein each pin of the first array of pins includes a substantially square cross-sectional shape and the acute angle is approximately 45°.

5. The die body apparatus of claim 1, wherein each pin of the first array of pins includes a cross-sectional shape selected from a group consisting of: a triangle, rectangle, pentagon, hexagon, heptagon, and octagon.

6. The die body apparatus of claim 1, wherein the first set of elongated feed channels comprises substantially parallel elongated feed channels and the second set of elongated feed channels comprises substantially parallel elongated feed channels.

7. The die body apparatus of claim 1, wherein a corresponding pair of elongated feed channels define each elongated feed passage, wherein the elongated openings of the corresponding pair of elongated feed channels include substantially identical widths.

8. The die body apparatus of claim 1, wherein the first discharge member is bonded with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the first honeycomb network of discharge slots.

9. The die body apparatus of claim 1, wherein the first face of the first discharge member is integrally bonded to the second face of the base member.

10. The die body apparatus of claim 1, wherein the first face of the first discharge member is diffusion bonded to the second face of the base member.

11. The die body apparatus of claim 1, further comprising a second discharge member including a first face, a second face, a third set of elongated feed channels that each include an elongated length extending along the first face of the second discharge member, a width extending transverse to the corresponding elongated length, a depth from the first face of the second discharge member, and an elongated opening intersecting the first face of the second discharge member and extending along the corresponding length of the elongated feed channel, the second discharge member further including a first array of pins that are spaced apart to define a second honeycomb network of discharge slots intersecting the second face of the second discharge member, wherein the third set of elongated feed channels are in fluid communication with the second honeycomb network of discharge slots, and wherein the second discharge member is configured to be bonded with respect to the base member such that each elongated opening of a plurality of the elongated feed channels of the first set of elongated feed channels is aligned with a corresponding elongated opening of the elongated feed channels of the third set of elongated feed channels to provide a plurality of elongated feed passages placing a plurality of the feed holes in fluid communication with the second honeycomb network of discharge slots.

12. The die body apparatus of claim 11, wherein the second discharge member is bonded with respect to the base member with each elongated opening of a plurality of the elongated feed channels of the first set of elongated feed channels being aligned with a corresponding elongated opening of the elongated feed channels of the third set of elongated feed channels to provide a plurality of elongated feed passages placing a plurality of the feed holes in fluid communication with the second honeycomb network of discharge slots.

13. The die body apparatus of claim 11, wherein the first face of the second discharge member is integrally bonded to the second face of the base member.

14. The die body apparatus of claim 11, wherein the first face of the second discharge member is diffusion bonded to the second face of the base member.

15. The die body apparatus of claim 11, wherein the first and second honeycomb network of discharge slots have substantially different configurations.

16. A method of assembling a die body apparatus comprising a base member including a first face, a second face, a plurality of feed holes intersecting the first face, and a first set of elongated feed channels that each include an elongated length extending along the second face, a width extending transverse to the length, a first depth from the second face, and an elongated opening intersecting the second face and extending along the length of the feed channel, wherein each of the elongated feed channels of the first set of elongated feed channels is in fluid communication with a corresponding set of the plurality of feed holes that are intersected by the elongated feed channel; and at least one discharge member including a first face, a second face, a second set of elongated feed channels that each include an elongated length extending along the first face of the at least one discharge member, a width extending transverse to the corresponding elongated length, a second depth into the at least one discharge member from the first face of the at least one discharge member, and an elongated opening intersecting the first face of the at least one discharge member and extending along the corresponding length of the feed channel, the at least one discharge member further including an array of pins that are spaced apart to define a honeycomb network of discharge slots intersecting the second face of the at least one discharge member, wherein the second set of elongated feed channels are in fluid communication with the honeycomb network of discharge slots, the method comprising the steps of:
- (I) forming the discharge slots to have a third depth into the at least one discharge member from the second face of the at least one discharge member, such that a sum of the second depth of the feed channels and the third depth of the discharge slots is greater than a height of the at least one discharge member; and
- (II) bonding a selected discharge member of the at least one discharge member with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the honeycomb network of discharge slots.

17. The method of claim 16, wherein the at least one discharge member includes a plurality of discharge members, and the method includes the step of selecting one of the plurality of discharge members for bonding during step (I).

18. The method of claim 16, wherein the honeycomb network of discharge slots of at least two of the plurality of discharge members have substantially different configurations, and wherein the step of selecting includes selecting one of the plurality of discharge members with a selected honeycomb network discharge slot configuration.

19. The method of claim 16, wherein the step of bonding includes integrally bonding the first face of the selected discharge member to the second face of the base member.

20. The method of claim 19, wherein the step of integrally bonding comprises diffusion bonding the first face of the selected discharge member to the second face of the base member.

21. A method of extruding batch material into a honeycomb body with a die body apparatus comprising a base member including a first face, a second face, a plurality of feed holes intersecting the first face, and a first set of elongated feed channels that each include an elongated length extending along the second face, a width extending transverse to the length, a first depth from the second face, and an elongated opening intersecting the second face and extending along the length of the feed channel, wherein each of the elongated feed channels of the first set of elongated feed channels is in fluid communication with a corresponding set of the plurality of feed holes that are intersected by the elongated feed channel; and at least one discharge member including a first face, a second face, a second set of elongated feed channels that each include an elongated length extending along the first face of the at least one discharge member, a width extending transverse to the corresponding elongated length, a second depth into the first discharge member from the first face of the at least one discharge member, and an elongated opening intersecting the first face of the at least one discharge member and extending along the corresponding length of the feed channel, the at least one discharge member further including an array of pins that are spaced apart to define a honeycomb network of discharge slots intersecting the second face of the at least one discharge member, wherein the second set of elongated feed channels are in fluid communication with the honeycomb network of discharge slots, the method comprising the steps of:
- (I) forming the discharge slots to have a third depth into the first discharge member from the second face of the at least one discharge member, such that a sum of the second depth of the feed channels and the third depth of the discharge slots is greater than a height of the at least one discharge member;
- (II) bonding a selected discharge member of the at least one discharge member with respect to the base member with each elongated opening of a plurality of the elongated feed channels of the first set of elongated feed channels being aligned with a corresponding elongated opening of the elongated feed channels of the second set of elongated feed channels to provide a plurality of elongated feed passages placing a plurality of the feed holes in fluid communication with the honeycomb network of discharge slots; and
- (III) extruding a quantity of ceramic or ceramic-forming batch material through the die body apparatus into an extruded honeycomb body with a honeycomb network of channels.

22. The method of claim 21, wherein the at least one discharge member includes a plurality of discharge members, and the method includes the step of selecting one of the plurality of discharge members for bonding during step (I).

23. The method of claim 21, wherein the honeycomb network of discharge slots of at least two of the plurality of discharge members have substantially different configurations, and wherein the step of selecting includes selecting one of the plurality of discharge members with a selected honeycomb network discharge slot configuration, wherein step (II) extrudes the honeycomb body with a preselected configuration of the honeycomb network of channels.

* * * * *